(12) United States Patent
Toyama et al.

(10) Patent No.: US 6,806,898 B1
(45) Date of Patent: Oct. 19, 2004

(54) SYSTEM AND METHOD FOR AUTOMATICALLY ADJUSTING GAZE AND HEAD ORIENTATION FOR VIDEO CONFERENCING

(75) Inventors: Kentaro Toyama, Redmond, WA (US); David J. Gemmell, Danville, CA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 09/528,827

(22) Filed: Mar. 20, 2000

(51) Int. Cl.$^7$ ................................................ H04N 7/14
(52) U.S. Cl. .............................. 348/14.16; 348/14.08; 348/14.01
(58) Field of Search ........................... 348/14.01–14.08, 348/14.09, 14.11–14.13, 14.16, 169; 382/103, 107, 118, 236

(56) References Cited

U.S. PATENT DOCUMENTS 5,500,671 A * 3/1996 Anderson et al. ......... 348/14.06
6,044,168 A * 3/2000 Tuceryan et al. .......... 382/118

OTHER PUBLICATIONS

Gibbs, Simon J., Arapis, C., Breiteneder, C.J., Teleport–Towards immersive copresence, Multimedia System 7:214–221, 1999.
MCS Research Tech report MSR–TR–99–46 Jun. 16, 1999.
MCS Research Tech report MSR–TR–99–80 Oct. 29, 1999.
Rose, D.A.D., Clark, P.M., A review of eye–to–eye video-conferencing techniques, UK Journal BT Technology Journal vol. 13, No. 4 pp. 127–131, Oct. 1995.

* cited by examiner

Primary Examiner—Melur Ramakrishnaiah
(74) Attorney, Agent, or Firm—Lyon & Harr, LLP; Katrina A. Lyon

(57) ABSTRACT

The present invention is embodied in a system and method for automatically adjusting gaze and head pose in a video-conferencing environment, where each participant has a camera and display. The images of participants are rendered in a virtual 3D space. Head-pose orientation and eye-gaze direction are corrected so that a participant's image in the 3D space appears to appear to be looking at the person they are looking at on the screen. If a participant is looking at the viewer, their gaze is set toward the "camera", which gives the perception of eye-contact.

9 Claims, 5 Drawing Sheets

   
FIG. 6A   FIG. 6B   FIG. 6C   FIG. 6D
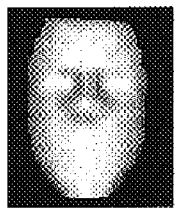  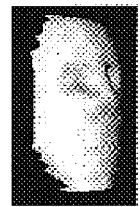 
FIG. 7A   FIG. 7B   FIG. 7C   FIG. 7D
  
FIG. 9A   FIG. 9B   FIG. 9C
 
FIG. 9D   FIG. 9E

SYSTEM AND METHOD FOR AUTOMATICALLY ADJUSTING GAZE AND HEAD ORIENTATION FOR VIDEO CONFERENCING

BACKGROUND OF THE INVENTION

1. Field of the Invention

The present invention relates in general to object detection and tracking, and in particular to a system and method for automatically adjusting gaze and head orientation for video conferencing.

2. Related Art

In face-to-face communication, gaze awareness, and eye contact in particular, are extremely important. Gaze is a signal for turn-taking in conversation. Also, it expresses attributes such as attentiveness, confidence, and cooperativeness. People using increased eye contact typically receive more attention and help from others, can generate more learning as teachers, and have better success with job interviews, etc.

These face-to-face communications are being increasingly replaced by teleconferencing, such as videoconferencing. As a result, videoconferencing has become popular in both business and personal environments. Unfortunately, eye contact and gaze awareness are usually lost in most videoconferencing systems. This is because the viewer cannot tell where the gaze of any other videoconferencing participant is directed in typical systems that use a camera that is located on top of a display device where the user interface appears. Namely, traditional videoconferencing applications present participants in separate windows of the user interface in order to provide spatial graphical representation of each participant on the display device and sacrifice gaze awareness.

For example, in these systems, if participant A desires to communicate with participant B during the videoconferencing, the gaze of participant A will be directed at the spatial representation of participant B (i.e. at the image of B on the A's display device). Since the viewpoint of the camera is typically not in line with the spatial representation of the participants (normally the camera is placed near or on top of the display device and not in the display device), participant A will be looking at the display device instead of participant B. Consequently, without gaze adjustments, as participant A is looking at the display device, and away from the camera and participant B, it is impossible for A to be perceived as looking directly out of B's display device and at B.

Therefore, because a videoconferencing participant looks at the images on their display device or monitor, and not directly into the camera, the participants never appear to make eye contact with each other. In addition, for multi-participant videoconferencing, video for each participant is in an individual window, which is usually placed arbitrarily on the screen. Consequently, gaze awareness also does not exist in these systems because each participant does not appear to look at the participant or participants that are being addressed during a conference.

Thus, in these videoconferencing environments, gaze awareness will also not exist because eye-contact is not present between the participants. Without gaze awareness, videoconferencing loses some of its communication value and can become uninteresting. This is because facial gaze, i.e., the orientation of a person's head, gives cues about a person's intent, emotion, and focus of attention. As such, gaze awareness can play an important role in videoconferencing.

To resolve this problem, several attempts have been made to create gaze awareness and spatialized teleconferences using specialized hardware. One system is the Hydra system, which uses a small display/camera pair for each participant, placed far enough from the user so that each participant's gaze at the display is virtually indistinguishable from gazing at the camera. Other systems have used half-silvered mirrors or transparent screens with projectors to allow the camera to be placed directly behind the display. However, these systems are expensive and hardware intensive.

Therefore, what is needed is a software system and method for automatically adjusting gaze and head pose in a videoconferencing environment. What is also needed is a videoconferencing system and method that restores gaze-awareness and eye-contact, and provides a sense of spatial relationship similar to face-to-face meetings with inexpensive software.

SUMMARY OF THE INVENTION

To overcome the limitations in the prior art described above, and to overcome other limitations that will become apparent upon reading and understanding the present specification, the present invention is embodied in a system and method for automatically adjusting gaze and head pose in a videoconferencing environment, where each participant has a camera and display.

In general, the images of participants are digitally rendered with a software module in a virtual 3D space. Next, head-pose orientation and eye-gaze direction are digitally corrected. The digital rendering and correction are preferably performed as internal mathematical computations or software operations without the need for a display device. As such, when the digital rendering and correction completed, the results are transmitted to a display screen so that a particular participant's image in the 3D space appears to other participants as if the particular participant was looking at the person they are looking at on the screen. For example, if a participant is looking at the viewer, their gaze is set toward the "camera", which gives the perception of eye-contact.

Specifically, the software system includes a vision component and a synthesis component. The vision component is employed when the video is captured. The vision component detects the head pose relative to the display, the eye gaze relative to the display, and the outlines of the eyes. The synthesis component places the images of the participants in a virtual multi-dimensional space. The head-pose can then be moved in multi-dimensional space (swiveled) and the eye gaze to be set in any direction in the virtual multi-dimensional space. In addition, the eye gaze can be set to look directly at the "camera" (viewpoint) of the multi-dimensional space, creating an impression of eye contact with anyone viewing the display.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIGS. 6A–6D illustrate graphical images of the eye synthesis component of the working example of the present invention.

FIGS. 7A–7D illustrate a simplified head model of the working example of the present invention.

FIGS. 9A–9E illustrate graphical images of a working example of the present invention.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Introduction

Many desktop videoconferencing systems are ineffective due to deficiencies in gaze awareness and sense of spatial relationship. Gaze awareness and spatial relationships can be restored by the present invention. The present invention is embodied in a software system and method for adjusting gaze and head orientation for video conferencing by first tracking a participant's head and eyes with a software vision component and then graphically manipulating the tracked data, namely, manipulating eye gaze and head orientation with a software synthesis component. In other words, the system and method of the present invention annotates video input with head and eye information and outputs an adjusted video with appropriate gaze and head orientation.

II. Exemplary Operating Environment

Figure 1:
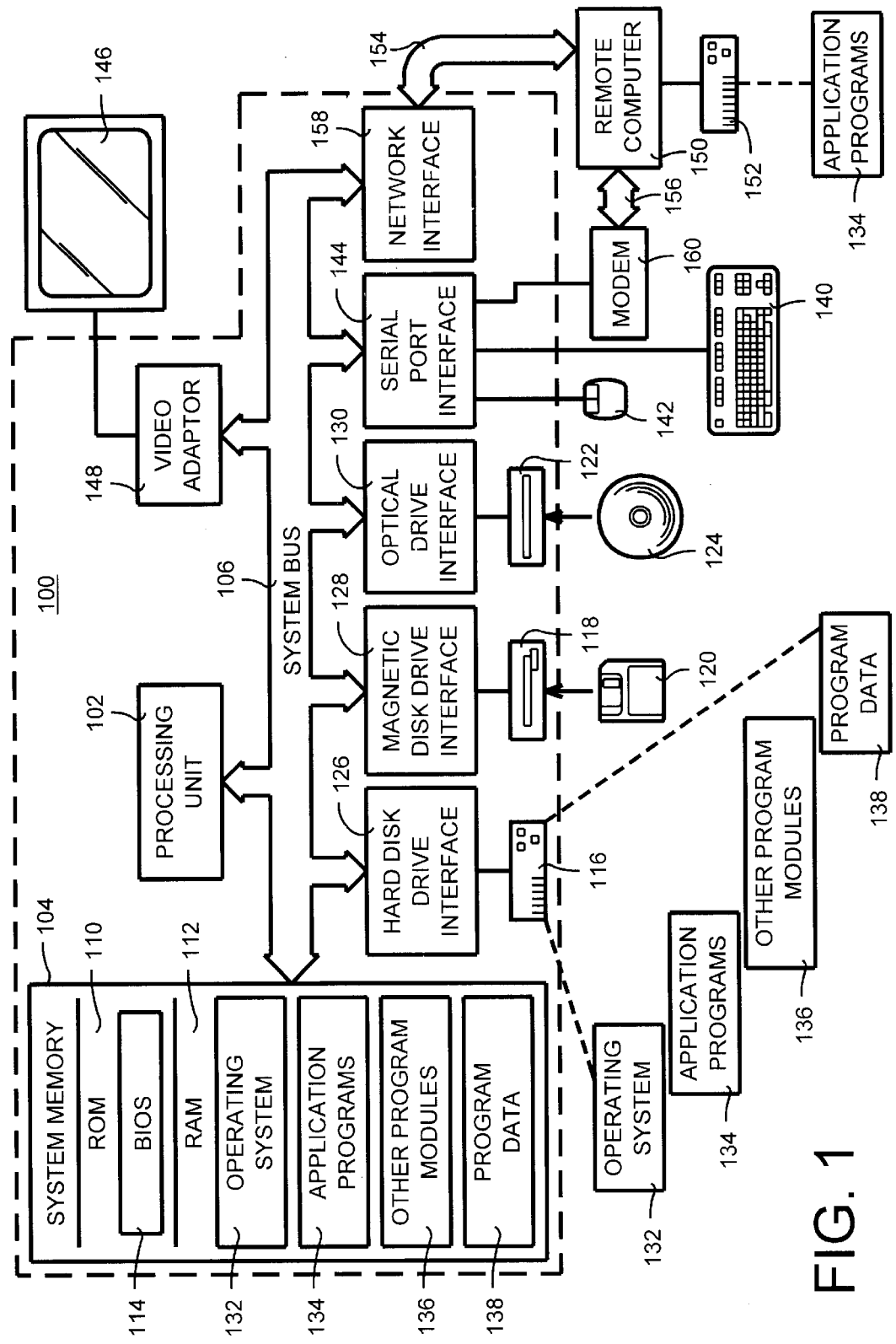
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used, such as a direct connection via an integrated services digital network (ISDN) connection.

III. General Overview

Figure 2:
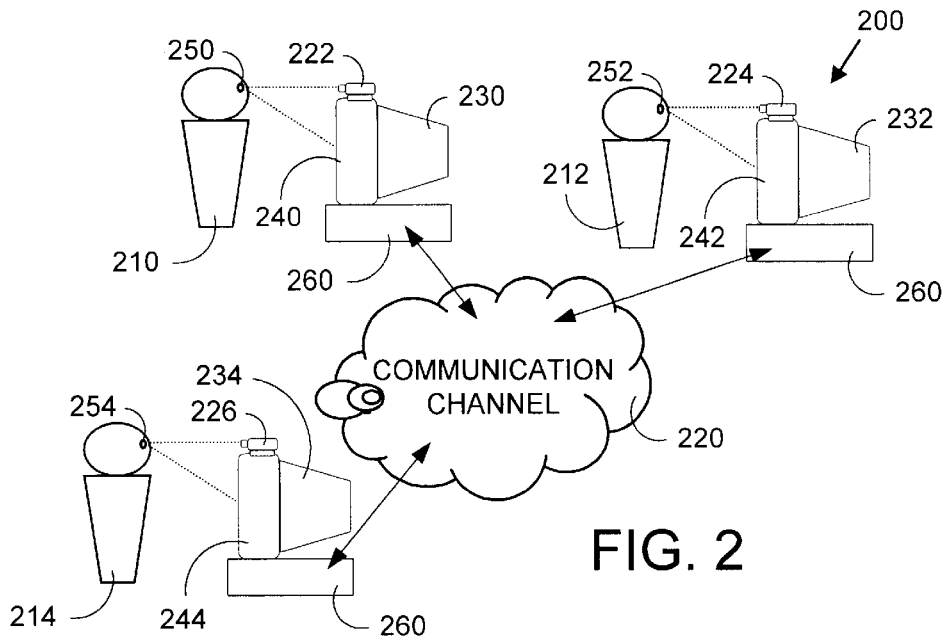
FIG. 2 is an overview of the videoconferencing environment of the present invention.

FIG. 2 is an overview of the videoconferencing environment of the present invention. FIG. 2 is shown for illustrative purposes only and any suitable videoconferencing environment can be used. The videoconferencing environment 200 of FIG. 2 includes participants 210, 212, 214 that are communicating with each other via any suitable communication channel 220, such as a network (for instance, a local area network, a wide area network, the Internet or a direct ISDN connection). Each user 210, 212, 214 has a camera 222, 224, 226, respectively, and a display device 230, 232, 234, respectively, for video communication between the participants. The cameras 222, 224, 226 transmit video signals over the communication channel to each display device. Each display device 222, 224, 226 contains a spatial representation 240, 242, 244, respectively, such as a user interface, of each of the participants. In addition, a speaker and microphone system (not shown) can be used for transmitting and receiving audio.

During a videoconferencing session, the participants communicate with each other by directing their respective eye gaze 250, 252, 254 at the spatial representations 240, 242, 244 of each other participant located on their respective display devices 222, 224, 226. The viewpoint of each camera 222, 224, 226 is not in line with the spatial representations 240, 242, 244 of the participants 210, 212, 214. As such, the participants will be looking at their respective display devices instead of the particular participant that they are communicating with during the videoconference. Videoconferencing software module 260 is included to solve this problem by automatically adjusting gaze and head pose in the videoconferencing environment 200.

IV. Details of Components and Operation

Figure 3:
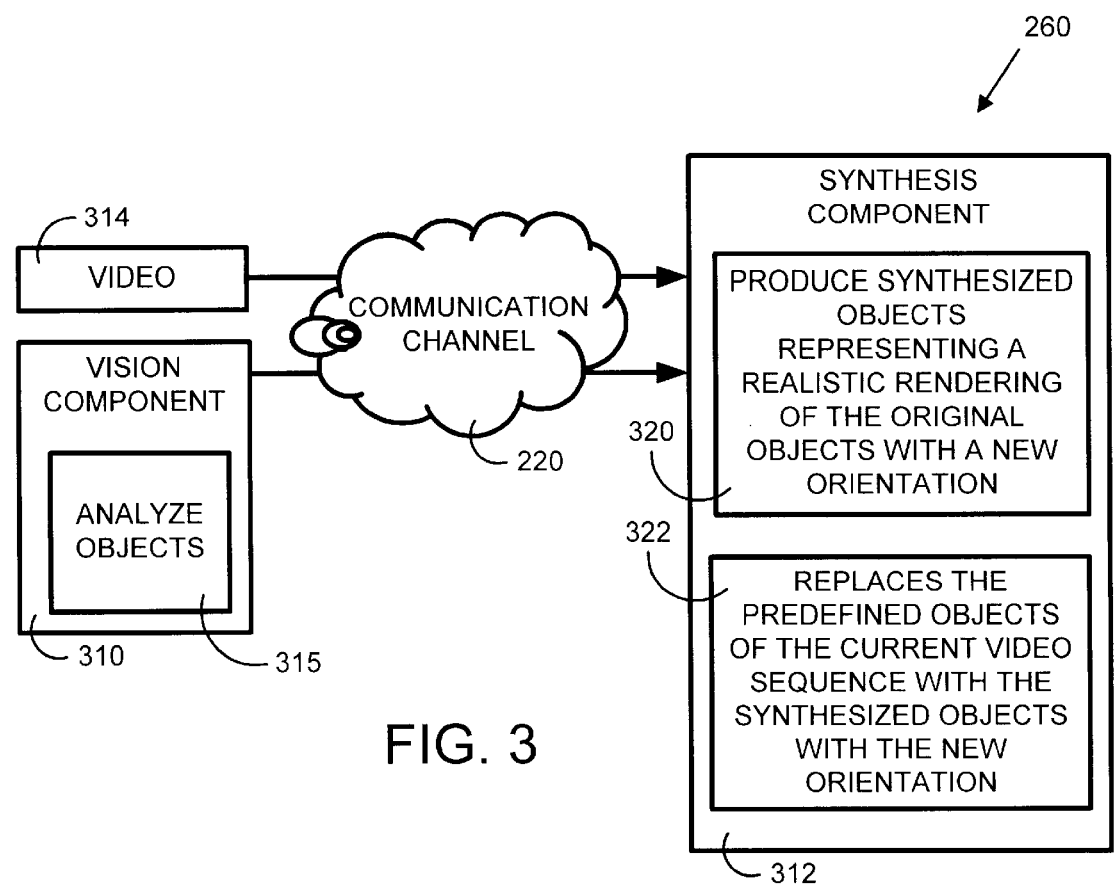
FIG. 3 is a general block diagram depicting an overview of the system of the present invention.

FIG. 3 is a flow diagram of the system and method of the present invention. In general, the videoconferencing software module 260 of FIG. 2 includes a vision component 310 and synthesis component 312 that operate as video 314 is received and transmitted (preferably as a stream of video sequences) over the communication channel 220. The vision component 310 automatically tracks and analyzes the properties of specific predefined objects, such as the head and eyes, within the received stream of video sequences. The vision component 310 can use any suitable computer vision, pattern recognition, motion analysis, etc. system to track, detect and analyze the video sequences (box 315). An initial process can be performed before videoconferencing between the participants begins for calibrating the vision component 310 and acclimating it for customization for each participant.

The synthesis component 312 produces synthesized objects representing a realistic rendering of the predefined objects with a new orientation (box 320) after receiving the analysis from the vision component 310 of the predefined objects. The synthesis component 312 then replaces the predefined objects of the current video sequence with the synthesized objects with the new orientation (box 322). As such, the stream of video sequences will include the synthesized objects. Optionally, additional objects, such as the head, can be analyzed, synthesized, rendered, replaced and re-oriented with the vision component 310 and the synthesis component 312.

In particular, the videoconferencing software module 260 of FIG. 2 automatically adjusts the orientation of the head and the eyes of each participant during video conference communication by rendering the eyes and the rest of the face arbitrarily to provide a desired orientation of the eyes and the head in virtual space. This is accomplished, for example, by producing synthesized eyes representing a realistic rendering of the actual eyes with a new orientation after receiving the computer vision analysis of the eyes and face from the vision component 310. The actual eyes of the current video sequence are then replaced with the synthetic eyes having the new orientation. Thus, during videoconferencing, the eyes of the participants can be reoriented to create gaze awareness between the participants. Optionally, to enhance the realism of the synthesis, the head can be analyzed, synthesized, rendered, replaced and re-oriented with the vision component 310 and the synthesis component 312.

V. Working Example

Figure 4:
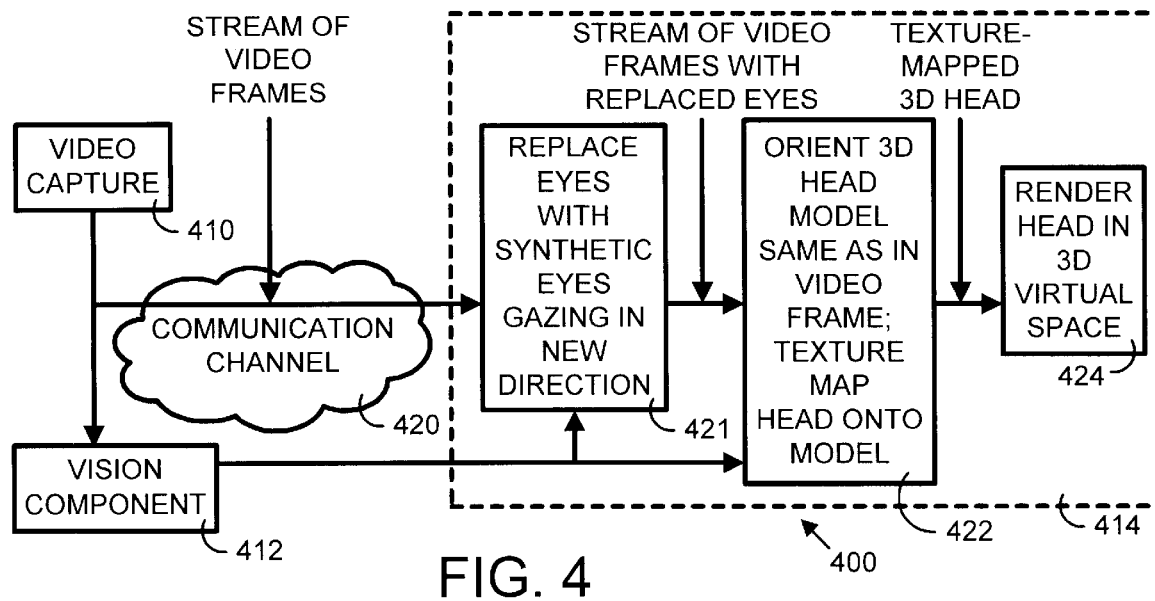
FIG. 4 is a detailed flow diagram of a working example of the present invention.

The following discussion describes a working example of the present invention for videoconferencing systems and is provided for illustrative purposes only. FIG. 4 is a detailed flow diagram of a working example of the present invention. Each videoconferencing system 400 includes a video capture device 410, such as a camera, a vision component 412 and a synthesis component 414, similar to the vision component 310 and the synthesis component 312 respectively described in general in FIG. 3. Also included is a communication channel 420 for facilitating videoconferencing communication by transmitting and receiving video and audio signals.

In operation, in general, the video capture device 410 captures video sequences of the participant using the system 400. The vision component 412 is activated when the video is captured, and analyzes vision data by detecting the head pose relative to the display (the orientation of the head), the eye gaze relative to the display (the direction of gaze), the outlines of the eyes and the position/outline of the face. The vision component 412 can use any suitable computer vision, pattern recognition, motion analysis, etc. system to track, detect and analyze the video sequences. For instance, feature tracking with pose estimation techniques can be used to analyze and determine facial gaze; contour tracking, such as snakes, active contour models, draping, etc. can be used to analyze and determine position/outline of the face as well as the outline of the eyes; and Hough transforms or infrared computer vision techniques can be used to determine eye gaze.

The data analyzed by the vision component 412 is transmitted over the communication channel 420, along with the video and audio. The synthesis component 414 receives the analyzed data and places the images of the participants in a virtual 3D space. Once the analyzed data is placed in 3D space, the head-pose can be swiveled, and the eye gaze can be set in any direction in the virtual 3D space. In addition, the eye gaze can be set to look directly at the video capture device's 410 viewpoint of the 3D space, creating an impression of eye contact with other videoconferencing participants or anyone viewing the video transmission.

The video sequences are rendered into a virtual 3D space with the synthesis component 414. The synthesis component 414 can accomplish this by first masking out the visible part of the eyeballs in the video sequence and replacing them with synthesized eyeballs, directed in the desired direction (box 421). Next, the video sequence with the replaced synthesized eyeballs is processed by projecting an image of the head (including the synthesized eyes) onto a simplified 3D head model (for example, with texture mapping) and arbitrarily orienting the 3D head in virtual 3D space (box 422). Last, the texture mapped 3D head can then be rendered in 3D virtual space (box 424).

The pixel positions of the eyes that are found in each frame of the video sequence can be indicated by a bitmask, along with a position of the upper left corner of the bitmask in the original video frame. However, the particular representation is not important. Similarly, the orientation of the head, and the direction of gaze can be represented as vectors, originating from the mid-point between the eyes, but again, the particular representation is not important.

Also, each user preferably transmits the positions of the camera and the images of other participants on the screen so that it can be determined from their head and gaze vectors that they are looking at (if anyone). Again, the representation is not important, but points in the same 3D space could be used for the head and gaze vectors. Details of synthesizing the eyes and texture mapping a head model will be discussed below.

Synthesizing the Eyes

Figure 5:
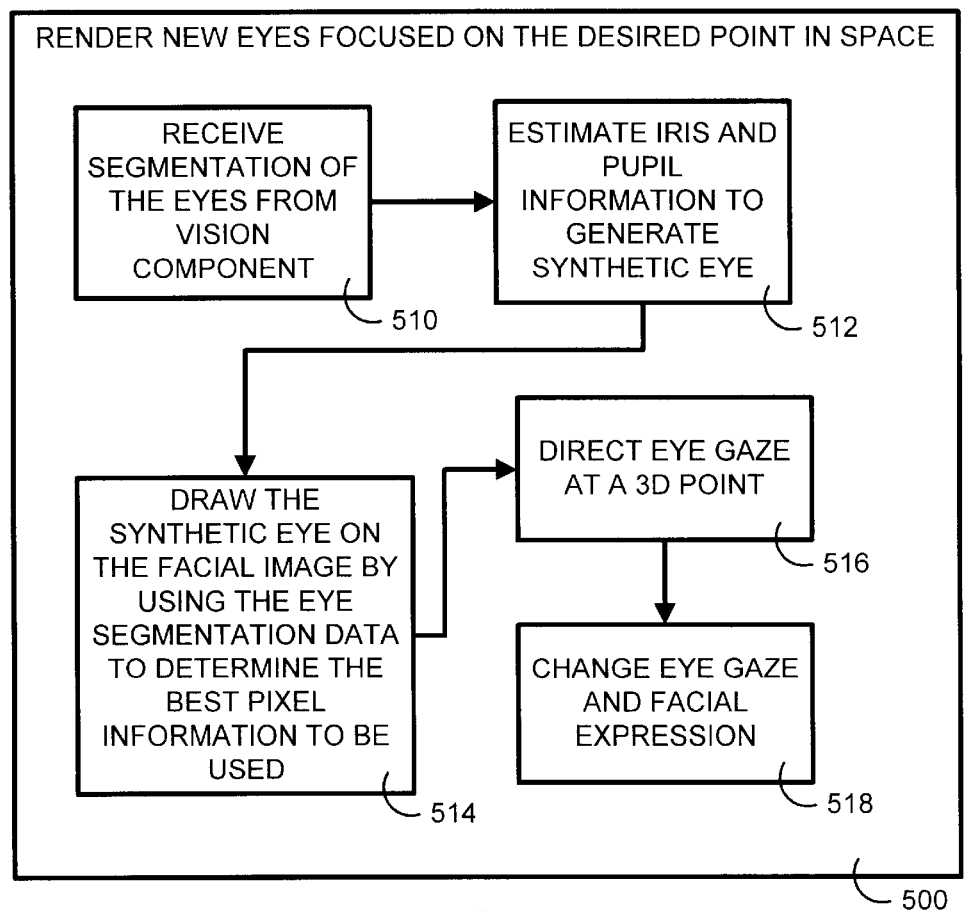
FIG. 5 is a detailed block diagram illustrating eye synthesis.

FIG. 5 is a detailed block diagram illustrating eye synthesis. The eyes can be synthesized by any suitable technique deemed realistic enough for videoconferencing purposes. One technique 500 that will be described below models the eyes as flat, with colored circles for the pupil and iris, which are shifted to simulate gaze adjustment. In general, as shown in FIG. 5, the vision component 412 of FIG. 4 analyzes the video sequences and provides a segmentation of the eyes, i.e., the visible part of the eyeballs (box 510) and iris and pupil information is estimated to generate a synthetic eye (box 512). Next, the synthetic eye is drawn on the facial image based on the segmentation data to determine the best pixel information to be used (box 514), eye gaze is directed at a 3D point (box 516) and the eye gaze and facial expression is changed (box 518).

Drawing an Eyeball

Specifically, drawing the eyes can be accomplished with computer graphics techniques given the eye segmentation. For instance, the average color of the white area, iris and pupil can be assumed to be known. If the size of the eyeball is known, the relative size of the iris can be estimated. The radius of the pupil is then fixed to be a fraction of the iris's radius. Dilation and contraction of the pupil are not currently modeled. To simplify rendering, the eyes are modeled without curvature. In practice, this is a reasonable approximation because the curvature of the eyes is typically not noticeable until the head is significantly oriented away from the viewer (more than 30 degrees from our observations). Second, it is assumed that the object being viewed is at a constant distance so that spacing between the pupils (due to eye vergence) remains approximately constant (described below).

One technique for creating an eyeball is by drawing two circles for the iris and pupil on a white canvas. Several additions could be made to give the eye a more realistic look. For example, a circle the color of the pupil, usually black, can be drawn around the edge of the iris. The iris's color typically becomes darker around the edges (the limbus). Also, random noise can be added to the iris and the white area to simulate texture in the eye. For smaller images, this effect should not be noticeable and is not needed. In addition, the white area can be made darker towards the left and right edges of the eye. The white area is commonly darker towards the edges especially on the nose side. Further, highlights or spectral reflections can be drawn on the eyeball. As the iris and pupil change position the white spectral reflection should stay in a constant position relative to the general eye position, assuming head orientation does not change.

Drawing the Eye on the Face Image

Drawing an eyeball on a face involves two steps. First, the eyeballs are drawn on a temporary image. Second, the eye segmentation data is used to decide for each pixel whether to use the pixel information from the original face image or from the eyeballs image. The simplest method for combining the face image and eyeball image is to use color keying, similar to blue screening. Every pixel that is segmented as an eyeball pixel is colored blue (or whichever color is the color key color.) The eyeball image can then be placed onto the face image. For a more refined or realistic look, the edges of the eyeball can be blended with the face image using alpha values. For example, FIGS. 6A–6D show the original face of the image, the original image with the eyeballs cutout and two synthesized images with redirected eyeballs combined with original face of the image. Namely, FIG. 6A shows the original face of the image, FIG. 6B shows the original face of the image with the eyeballs cutout, FIG. 6C shows a synthesized image with redirected eyeballs combined with the original face of the image looking left and FIG. 6D shows a synthesized image with redirected eyeballs combined with the original face of the image looking right.

Directing Eye Gaze at a 3D Point

Controlling eye gaze means controlling where the eyes are looking in 3D space. The 3D point that the eyes are looking at is called the gaze point. The pupil positions that give the appearance that the eyes are focused on the desired gaze point are determined. The eyes should converge or diverge as the gaze point moves closer or further away from the face. In order to compute the eye pupil positions the following is needed: (1) the 3D location of the eyeball centers; (2) the radius of the eyeball; and (3) for a 3D-head model, its orientation and position in 3D space.

Since the model of the eyeball is flat, only the plane on which to render the eye and the center of the pupil needs to be computed. The computation can be made easier by making the approximation that this plane is itself fixed with respect to the head. First, the head is rotated to be positioned upright looking down the Z-axis (the axis that is normal to the facial plane). The gaze point is rotated by the same rotation. For each eye, the gaze point is then projected onto a Z-plane (a plane which holds Z constant—this is an approximation of the actual plane that should be used), using the eyeball center as the projection point. The Z-plane is placed in front of the eyeball center at a distance equal to the eyeball radius. The line through the gaze point and the projection point is then intersected with the Z-plane to find the projection of the gaze point on the Z plane. This point marks the center of the rendered pupil. Finally, the point is transformed by the inverse of the rotation first applied to the head.

When the head is oriented towards the viewer and the eye gaze is also directed towards the viewer, the pupil location is the same if the eyeball is modeled as a sphere or a plane. As the head rotates away from the viewer, the plane approximation becomes monotonically less accurate. This effect, however, is mitigated for three reasons: First, extreme combinations of head orientation and eye gaze (e.g., head facing left and eye gaze sharply to the right) are rare and difficult to modify for other reasons (tracking the eyes in such situations presents significant challenges for vision); thus, our project restricts eye gaze modification to instances when the head is oriented frontally, only (within~30 degrees). Second, it is assumed that human viewers are poor judges of eye gaze when a face is not oriented directly toward the viewer. Thus, the errors in approximation are unlikely to cause problems with viewers.

Changing Eye Gaze and Facial Expression

When manipulating eye gaze as described above, there can be a side effect. Namely, the repositioning of the pupils can change the expression of the face. Typically when a person looks up or down the top eyelid follows the top of the pupil. Since the shape of the eye remains constant with the above method, the eyelid does not move up and down as it would naturally. When the top eyelid is too low, it gives the face an expression of disgust and when the top eyelid is too high, the face appears surprised. There are several techniques to change a person's eye gaze vertically without changing expression. One technique includes synthesizing the eyelids along with the eyeballs. The second technique includes warping the entire face appropriately (which will be discussed below). The effect is minimal when the change in pupil position is small vertically. Changes in pupil position horizontally have little noticeable effect on facial expression.

Face Image Warping

The following describes rotating the entire head to change gaze. This section describes warping the face image using correspondence maps. Head orientation can be manipulated based on warping the face image. Warping an image moves the pixels within an image. With a face image, it is desirable to move the pixels to give the appearance of a face changing orientation. In order to get this effect, it is required to know where to move the pixels. The array that contains this information about how to move the pixels is called a correspondence map. Finding the correct correspondence map is the key issue in image warping.

For a one dimensional image warp, an example using face images would be rotating a frontal view of a face to a right view of a face. The appropriate correspondence map would indicate how to move pixels in the frontal view in such a way that the right view results. Although there are some problems with occlusion and disocclusion, this only occurs if the face is rotated enough to create significant self-occlusions.

The correspondence map can be automatically computed given two images, one of the frontal view and one of a right view. For each pixel in the frontal view, a search can be performed within a 2D neighborhood around the same coordinate in the right view to find the corresponding pixel. To increase the likelihood of finding the best correspondence, small rectangular regions (templates) are matched instead of isolated pixels. If camera calibration information is obtained for the two images the search area can be reduced to a 1D line. It is assumed that the camera calibration information is not known.

When searching within a 2D area around a pixel, the size of the template can be varied to make tradeoffs between accuracy and precision. Many correspondence methods have also explored post processing the correspondence maps to remove noise. There are numerous stereo vision and optical flow techniques that will yield many variations on the standard techniques.

Image Warping Implementation

First, a frontal image of a face is obtained and warped so that it looks up. To find the proper warping, the correspondence map between a frontal view of a face and a face looking up is computed. One method of computing the correspondence maps includes using a standard stereo vision technique based on Sums of Absolute Differences. A search can be performed within a 2D area around each pixel in the frontal image with the image of the face oriented up.

Another method to compute a better correspondence map uses two initial correspondence maps to compute a final refined correspondence map. The two initial correspondence maps are the correspondences in each direction between the frontal image with the image of the face oriented up, i.e., correspondence from image A to image B and correspondence from image B to image A. Next, the matches which are consistent between the two correspondence maps, are kept and the rest discarded. To fill in the holes left by the inconsistent matches, interpolation can be performed between the consistent matches. This method improves the correspondence maps and the warping results. Warping the frontal face image to the position of the face in the other image can produce realistic results. Warping the image to rotate the face further up causes obvious deformations in the face. The inverse of the correspondence map to warp the face down can be used as long as the face was not warped too far.

Next, the two correspondence maps are combined for warping the frontal face image left and up. The same techniques are used to compute each correspondence map. The correspondence maps can then be linearly combined to compute the warping of the image. The results were good when either warping left or up. However, when the two correspondence maps are combined to move the face left and up, deformations are significant. For small angles (<5 degrees), image warping is acceptable, but noticeable distortions occur with angles greater than 10 degrees. Thus, image warping is not preferred.

Texture Mapping a 3D Head Model

Another method for changing the head orientation is texture mapping a 3D model. This method is preferred over image warping. In general, first a 3D model in the shape of the person's head is created. The face image is then projected onto the model with texture mapping (described below in detail). After the face image is projected onto the model, the model can be rotated to any desired orientation.

The image warping and texture mapping methods are basically equivalent, except the correspondence maps are in essence already computed with the generation of a head model with texture mapping.

Any suitable head model could be used in the present invention. For instance, one simplified head model will be described below and is shown in FIGS. 7A–7D. For illustration, FIGS. 7A–7D show the head model as: a front view (FIG. 7A); a side view (FIG. 7B); a perspective view (FIG. 7C); and a wire frame view (FIG. 7D). In this example, the head model is intentionally simple, so that the vision component 412 need only track the eyes accurately. Although a detailed head model could be used, it would probably require tracking of many facial features. In general, the head model is roughly egg-shaped and the eyeballs are modeled as being flat, with the eye sockets receded into the face. The nose protrudes out the front. The model is fitted separately for each user to account for differences in facial shape. Based on eye location information from the vision system, the model can be scaled to the appropriate size. The amount the eyes are receded into the face and the amount the nose protrudes from the face are fixed.

Creating a 3D Head Model

Specifically, when creating a 3D head model, certain details are more important than others. When judging head orientation, two features are important. First, he eyes should be modeled correctly. While the eyeballs themselves may be flat, the eye socket must be receded into the face. This is important to obtain a realistic look when rotating the head up and down. Second, the nose should be modeled as protruding out of the face.

Other parts of the face, which affect judgment of head orientation less, such as the mouth, forehead, and cheeks, can be modeled by flat or slightly rounded surfaces. The model is preferably fitted separately for each user to account for differences in facial shape. Since the eye and nose are important features, the model is scaled to fit the face based on the geometric relationship of the eyes and nose. The amount the eyes are receded into the face and the amount the nose protrudes from the face are fixed. It is assumed that the head will not be rotated more than 30 degrees, so the results should be realistic for a reasonable range of facial orientations.

Texture Mapping a Head Model

Figure 8:
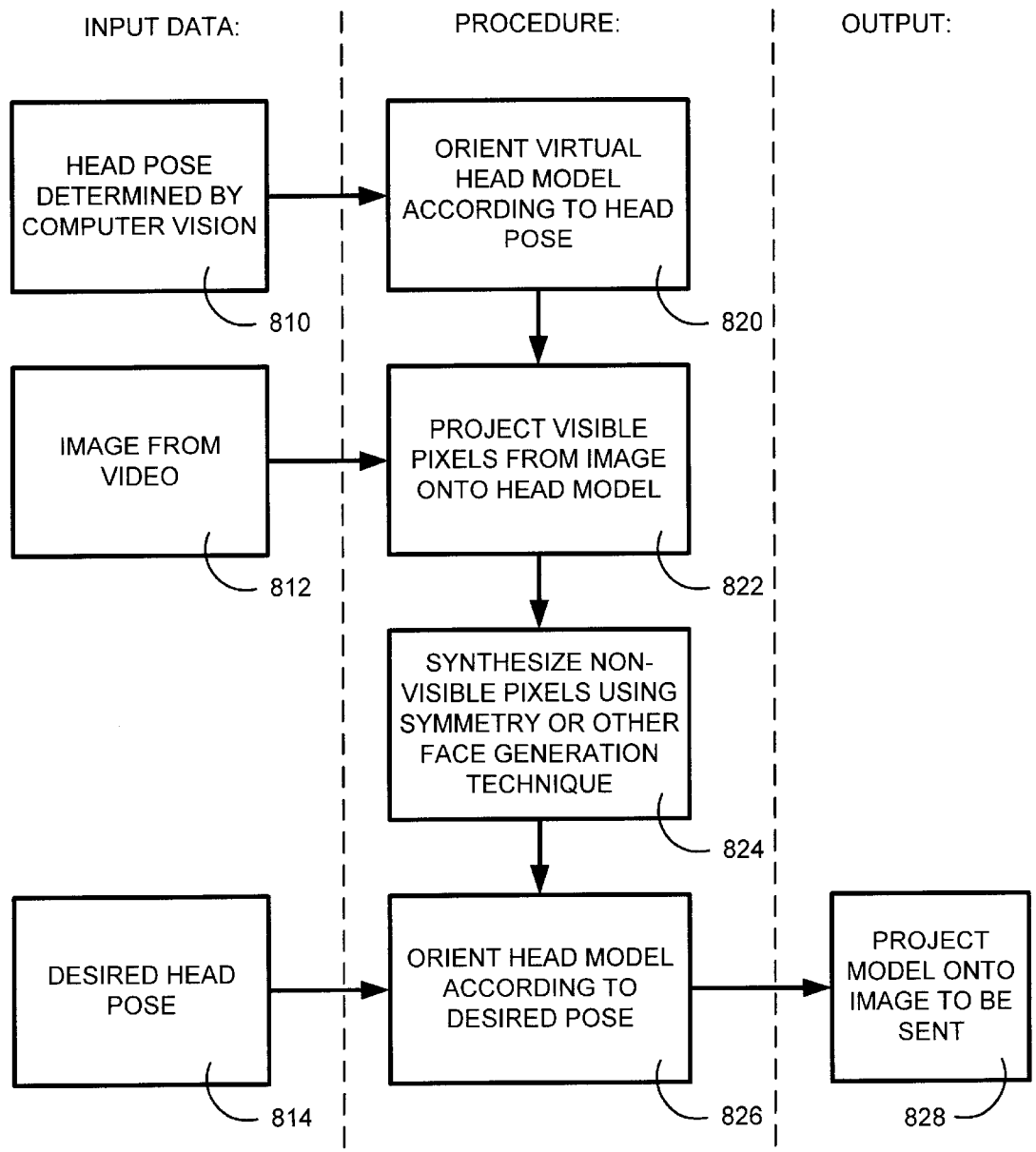
FIG. 8 is a detailed block diagram illustrating texture mapping of the head.

In general, FIG. 8 is a block diagram illustrating texture mapping of the head by the synthesis component 414 of FIG. 4. As shown in FIG. 8, the input data includes head pose information determined by the vision component 412 of FIG. 4 (box 810), images from the video capture device 410 of FIG. 4 (box 812) and the desired head pose (predefined by the user or the videoconferencing system) (box 814).

In operation, the head pose information is received and the virtual head model is oriented according to the head pose (box 820). The image from the video is then used to project visible pixels from the image onto the head model (box 822). Next, non-visible pixels are synthesized using symmetry or other suitable face generation technique (box 824). The head model is then oriented according to the predetermined desired pose (box 826). As output, the model is projected onto the image to be sent in the video transmission during the videoconference (box 830).

Head projection onto the 3D head model can be accomplished using standard texture-mapping techniques. Positioning can be accomplished by with the following technique.

In order to texture map a model, three values are required. First, the position of an anchor point on the 3D model and its location in the face image is required. The center between the nostrils or between the eyes can be used. (This point is easy to track since it does not deform significantly when the face rotates or expression changes). Second, the orientation of the head in the face image is required. This can be computed several ways. One method is to track multiple points on the face and compute head orientation from their relative spacing. Another method is to compute head orientation based on how a feature deforms, such as tracking the nostrils and computing head orientation based on how they change shape. Third, the amount to scale the head model to correspond to pixel space is required. This can be computed while head orientation is being computed.

For each vertex of the head model, its 2D texture coordinates is computed. The texture coordinates are the location in the face image that the vertex corresponds to. If the three values described above are known, the texture coordinates for each vertex can be computed with the following steps. It is assumed that the model is being rotated about the nose, however any point can be used. First, for each vertex in the head model, subtract the value of the anchor point. Second, rotate the head model to the same orientation as the head in the face image. Third, scale the X and Y coordinates to correspond to, pixel values. This is equivalent to doing an orthographic projection onto the image. An orthographic projection assumes all lines of sight are parallel, unlike the pinhole projection in which the lines of sight intersect at a point. Last, add the 2D pixel location of the nose in the face image. For illustration, FIGS. 9A–9E show the original image (FIG. 9A), the face oriented up left (FIG. 9B), the face oriented up right (FIG. 9C), the face oriented down left (FIG. 9D) and the face oriented down right. (FIG. 9E).

Dealing with Head Shape Changes

When a person is talking or changes expression, the 3D shape of the head can change. The most obvious example is the chin moving up and down when a person is talking. If it is assumed that the head model does not change shapes, problems could be introduced. As such, one solution is to extend the wire-frame chin below its normal position, so that when the mouth is opened, the chin texture will not slip down to the neck area. Also, when the mouth is closed, the neck will appear to be attached to the bottom of the chin, but this will not be noticeable until the head is rotated significantly away from the viewer.

The eyes and nose are used most when judging head orientation. The eye sockets do not change shape and the shape of the nose rarely deforms. The nose and eyes can be used to judge head orientation because these features typically do not change shape. This is to the model's advantage, allowing the use of a static head model to achieve reasonable realism.

Inadvertent Changes of Expression

When rotating a head model away from the orientation of the head in the face image the features of the face can become deformed. Assuming the texture coordinates were found correctly, any deformations in the face are caused by the face model being incorrect. Many deformations go unnoticed, such as the side of the head being too narrow. Other deformations can actually cause changes of expression in the face. If the curvature of the mouth is incorrect in the head model, the mouth may appear to look either happy or sad when the head model is rotated up and down. The same may occur with the eyebrows, resulting in their appearing too tilted. Since the curvature of the mouth is different for everyone, finding an adequate solution to this problem may require well known "structure from motion" computer vision techniques, whereby the 3D structure of the face can be computed from a video sequence. The parameters important to ensure consistent expressions can be found. However, if the orientation of the head within the face image is found incorrectly, the same effect can occur. Changes in expression can result when the face image is texture mapped onto the head model incorrectly. The problem will be most noticeable with errors in the vertical orientation of the head.

CONCLUSION

The working example described two methods for manipulating gaze, eyeball synthesis and head reorientation. A planar model was used for eyeballs. Eyeballs for low-resolution (128×128) face images can be realistically drawn given the correct segmentation. Two different techniques were described for manipulating head orientation. The first involved image warping. For small angles of rotation (<5 degrees), warping a person's head to a new orientation was successful. For larger changes in rotation, realism was lost due to distortions. The correspondence maps that directed the warping of the face image can be difficult to compute since the skin is a non-Lambertain surface. Errors in the correspondence maps resulted in distortions. Due to these problems, the second technique for head orientation, namely, texture mapping a 3D-head model with a face image, is preferred for manipulating head orientation.

Texture mapping a 3D-head model with a face image allows the head model to be rotated to the desired orientation. When the face image is successfully mapped onto the head model, realistic rotations of 30 degrees or more can be obtained. Although the current head model described is very crude, a more realistic head model and/or one that is adapted to different users could be used to increase realism.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for digitally adjusting the orientation of features of an object for video conference communication, comprising:

receiving information relating to the pose of the object;

orienting a virtual model of the object and the features according to the pose of the object;

projecting visible pixels from a portion of the videoconference communication onto the virtual model;

synthesizing non-visible pixels;

orienting the virtual model according to a predetermined pose; and projecting the virtual model onto a corresponding portion of the videoconference communication to replace predetermined features of the object.

2. The method of claim 1, wherein the video conference communication occurs between at least two participants and is facilitated by at least one of the Internet, integrated services digital network, or a direct communication link.

3. The method of claim 1, wherein the object is a head, the feature is at least one of a facial gaze, eye gaze and a head, and further including an element that is at least one of an eye and a face.

4. The method of claim 1, wherein the synthesis component renders at least one feature by receiving segmentation information of the feature from the computer vision component for producing the synthetic features.

5. A method for digitally adjusting the gaze and orientation of a head for video conference communication, comprising:

receiving information relating to the pose of the head;

orienting a virtual model of the head and facial gaze of the head according to the pose of the object;

projecting visible pixels from a portion of the videoconference communication onto the virtual model;

creating synthesized eyes of the head that produces a facial gaze at a desired point in space;

orienting the virtual model according to the produced facial gaze; and projecting the virtual model onto a corresponding portion of the videoconference communication to replace the original gaze and orientation of the head with the virtual model.

6. The method of claim 5, wherein creating synthesized eyes includes receiving segmentation information of the eyes and estimating iris and pupil information to create the synthetic eye.

7. The method of claim 6, wherein creating synthesized eyes further includes digitally drawing the synthetic eyes on a corresponding portion of the video conference communication using the segmentation information to replace the original eyes with the synthetic eyes.

8. The method of claim 5, further comprising digitally adjusting the synthesized eyes of the virtual model in real time during videoconference communication.

9. The method of claim 5, wherein the video conference communication occurs between at least two participants and is facilitated by at least one of the Internet, integrated services digital network, or a direct communication link.

* * * * *